Patented Dec. 22, 1931

1,837,852

UNITED STATES PATENT OFFICE

LUDWIG J. CHRISTMANN, OF JERSEY CITY, NEW JERSEY, ASSIGNOR TO AMERICAN CYANAMID COMPANY, OF NEW YORK, N. Y., A CORPORATION OF MAINE

BUTYL XANTHATE FLOTATION

No Drawing.   Application filed May 29, 1930. Serial No. 457,521.

This invention relates to the flotation of ores, more particularly to the use in the froth flotation of copper, zinc, lead and similar ores, of certain new reagents which increase the efficiency of the flotation operation.

There have been used in the past a number of reagents which, added in small amounts to a pulp in a flotation circuit, aided in and caused the floating of the mineral particles in a froth, which was then removed and the mineral recovered therefrom. Among such reagents was potassium ethyl xanthate. This reagent has been in extensive use and has been considered highly effective in the flotation of ores, and has been a standard of comparison for reagents.

I have discovered that greater efficiency in flotation may be obtained by the use of other xanthates, specifically secondary butyl xanthates in place of the old reagents. This new reagent has been extensively tested both in laboratory operations and in large scale mill production with uniformly superior results over those obtained with potassium ethyl xanthate. In all cases the amount of mineral recovered from the pulp has been greater. In some cases the increased recovery has not been over a few tenths of one percent, but in other cases the increase in recovery has been 1% and even much more. In no case, regardless of the type or character of the ore floated, has the recovery been less than the recoveries obtained by potassium ethyl xanthate. My new reagents may be prepared in any desired manner, as for example, by the process described in the co-pending application of Christmann and Jayne, Serial No. 444,345, filed April 14th, 1930, now Patent 1,810,552 of June 16, 1931 entitled Secondary butyl xanthates. However, the present invention is not limited to the method of preparation of the material.

My reagents, which are water soluble, have most probably the following structural formula:

where M is an alkali metal, such as sodium or potassium.

In the operation of my invention I have utilized a copper ore of the Anaconda Copper Company which was treated as follows:

1200 grams of ore was ground with 600 cc. of water and 4.5# of lime per ton of ore for ten minutes in a steel rod mill. The resulting grind had an analysis of 47% through a 200 mesh screen. The pH of the flotation pulp was 11.9. Flotations were conducted with potassium ethyl xanthate and with sodium secondary butyl xanthate in identical amounts under the same conditions the pulp being agitated for three minutes before the first or concentrate float and agitated for seven minutes before the second or middling float. The results obtained are tabulated below.

| Assays % Cu | | | | | Reagents | | |
|---|---|---|---|---|---|---|---|
| Feed | Conc. | Midd. | Tail | % copper recovery | Sodium sec. butyl xanthate | Potassium ethyl xanthate | Lbs. ton pine oil |
| 5.00 | 28.85 | 8.95 | 0.87 | 85.4 | -------- | 0.01 | 0.12 |
| 5.04 | 28.80 | 8.52 | 0.38 | 94.0 | 0.01 | -------- | 0.12 |

The copper recovery by the use of my new reagent is much more complete than that by the old reagent. Such an increased recovery when applied to a mill treating thousands of tons of ore per day means an enormous saving in cost of production.

Another example of an ore treated is that of the United Verde Copper Company, which was treated as follows:

1200 grams of ore were ground with 600 cc. of water and 5# of lime per ton of ore for eight minutes in a steel rod mill. The analysis of the resulting material was 63.5% through a 200 mesh screen. The pH of the pulp was 12.0. The floatation operation was conducted for three minutes to obtain a concentrate and for five minutes to obtain the middling. The results of comparative tests with my reagent and potassium ethyl xanthate are set forth in the following table:

| Assays % Cu | | | | % copper recovery | Sodium sec. butyl xanthate | Potassium ethyl xanthate | Lbs./ton pine oil |
|---|---|---|---|---|---|---|---|
| Feed | Conc. | Midd. | Tail | | | | |
| 3.12 | 15.05 | 6.92 | 1.24 | 69.8 | | 0.01 | 0.04 |
| 3.20 | 16.20 | 6.60 | 0.70 | 82.4 | 0.01 | | 0.04 |

In this case, it will be noted that the increased recovery was 12.6%, a most remarkable increase over the efficiency of the old reagent.

In the above examples 0.01 lbs. of reagents per ton of ore was used, and because of such small amounts the percent of recovery of copper was not as high as is desired commercially. In other comparative tests larger amounts were used, for example, 0.02 lbs., 0.03 lbs., 0.04 lbs. and 0.08 lbs. per ton of ore. These tests showed progressively increasing recoveries by both reagents, but in every case the superiority of sodium secondary butyl xanthate over potassium ethyl xanthate was apparent, as shown by the following tables:—

ANACONDA ORE

| Xanthate | % copper recovered | | | | |
|---|---|---|---|---|---|
| | 0.01 | 0.02 | 0.03 | 0.04 | 0.08 |
| K. ethyl | 85.4 | | 94.8 | 96.7 | 97.5 |
| Na-sec. butyl | 94.0 | | 96.0 | 97.0 | 97.5 |

UNITED VERDE ORE

| | 0.01 | 0.02 | 0.03 | 0.04 | 0.08 |
|---|---|---|---|---|---|
| K. ethyl | 69.8 | 82.6 | | 90.0 | 93.6 |
| Na-sec. butyl | 82.5 | 91.3 | | 95.3 | 96.8 |

From the foregoing it is perfectly apparent that my new reagents are far superior to potassium ethyl xanthate which has been considered as an extremely valuable reagent in flotation of various ores. My new reagents are not only more efficient in recovery, but are cheaper to produce than potassium ethyl xanthate. Such low cost production is obtained both because of the efficiency of the reaction giving a high yield and the cheapness of the reacting ingredients.

What I claim is:

1. A method of recovering minerals from ores which comprises subjecting an ore to a froth flotation operation in the presence of a salt of secondary butyl xanthate as a promotor.

2. A method of recovering minerals from ores which comprises subjecting an ore to a froth flotation operation in the presence of an alkali metal salt of secondary butyl xanthate as a promotor.

3. A method of recovering minerals from ores which comprises subjecting an ore to a froth flotation in the presence of the sodium salt of secondary butyl xanthate as a promotor.

4. The method of recovering minerals from ores which comprises subjecting an ore to a froth flotation operation in the presence of a promotor, having the following structural formula:

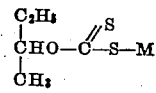

where M is a metal which forms a water soluble salt.

5. A method of recovering minerals from ores which comprises subjecting an ore to a froth flotation operation in the presence of a promotor having the following structural formula:

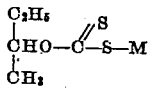

where M is an alkali metal.

6. A method of recovering minerals from ores which comprises subjecting an ore to a froth flotation operation in the presence of a promotor having the following structural formula:

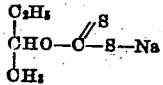

In testimony whereof, I have hereunto subscribed my name this 27 day of May, 1930.

LUDWIG J. CHRISTMANN.